(12) United States Patent
White et al.

(10) Patent No.: US 7,673,857 B2
(45) Date of Patent: Mar. 9, 2010

(54) STRUCTURED PACKING AND USE THEREOF

(75) Inventors: Vincent White, Epsom (GB); Mohammad Ali Kalbassi, Weybridge (GB); Brian Waldie, Biggar (GB); Jonathan Wilson, West Molesey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 779 days.

(21) Appl. No.: 11/400,977

(22) Filed: Apr. 10, 2006

(65) Prior Publication Data

US 2006/0244159 A1 Nov. 2, 2006

(30) Foreign Application Priority Data

Apr. 28, 2005 (GB) ................... 0508670.7

(51) Int. Cl.
*B01F 3/04* (2006.01)
(52) U.S. Cl. ............... 261/95; 261/112.1; 261/DIG. 72
(58) Field of Classification Search ............ 261/94, 261/95, 112.1, 112.2, DIG. 72
See application file for complete search history.

(56) References Cited

U.S. PATENT DOCUMENTS

| 5,064,448 | A | * | 11/1991 | Choi ........................ 95/253 |
| 5,149,344 | A | * | 9/1992 | Macy ........................ 96/159 |
| 5,632,962 | A | * | 5/1997 | Baker et al. ................ 422/211 |
| 5,730,000 | A | * | 3/1998 | Sunder et al. ............... 62/643 |
| 5,984,282 | A |   | 11/1999 | Armstrong et al. |
| 6,164,458 | A | * | 12/2000 | Mandrin et al. ............ 210/521 |
| 6,211,255 | B1 |  | 4/2001 | Schanke et al. |
| 6,251,499 | B1 |  | 6/2001 | Lehman et al. |
| 6,294,053 | B1 | * | 9/2001 | Darredeau .................. 202/158 |
| 6,357,728 | B1 | * | 3/2002 | Sunder et al. ............. 261/112.2 |
| 6,397,630 | B1 |  | 6/2002 | Fraysse et al. |
| 6,907,751 | B2 | * | 6/2005 | Kalbassi et al. ............... 62/617 |

FOREIGN PATENT DOCUMENTS

EP 0 703 000 A2 3/1996
EP 1 036 590 12/2000

OTHER PUBLICATIONS

Weedman John A., Dodge Barnett F.; "Rectification of Liquid Air in a Packed Comun."; Ind. and Eng. Chem.; vol. 39, No. 6; 1947; pp. 732-744; XP002394817.

(Continued)

*Primary Examiner*—Scott Bushey
(74) *Attorney, Agent, or Firm*—Eric J. Schaal (57) ABSTRACT

At least one section of structured packing where the length of the section is about 1 m to about 6 m; and where the specific surface area of the structured packing of the section is greater than 500 $m^2/m^3$, is used in a vapour/liquid contact column operating in locations where environmental conditions adversely affect steady state operation of the column to reduce maldistribution of liquid in the column under motion. The structured packing section has particular application offshore on a buoyant platform where tilt of the column out of vertical alignment due to the rolling motion of the platform can significantly affect the efficiency of the column.

13 Claims, 8 Drawing Sheets

OTHER PUBLICATIONS

F. De Bussy, "On Board Air Distillation for Off-Shore Gas-To-Liquid Conversion," AlChE, Mar. 2000, pp. 61-68.

R.K. Tanner, "Modelling the Performance of a Packed Column . . . ," Trans. I. Chem. E., 1996, E. 74.A, pp. 177-182.

Berndt K. Hoerner, "Effect of Irregular Motion on Absorption/Distillation Processes," CEP, Nov. 1982, pp. 47-54.

R.K. Tanner, "Effects of Tilt and Motion of a Packed Deaeration Column," I. Chem. E. Symp., 128, 1992, pp. B111-B118.

B. Waldie, "Liquid Distribution From Structured Packings Under . . . ," AlChE Distillation Meeting, Spring 2004.

Kistler, Henry Z., "Packing Design and Operation", Distillation Design, 1992, pp. 421-521, McGraw-Hill Inc., USA.

* cited by examiner

STRUCTURED PACKING AND USE THEREOF

TECHNICAL FIELD OF THE INVENTION

The present invention relates generally to the use of structured packing in vapour/liquid contact columns. The invention has particular application in columns to be operated in locations where environmental conditions adversely affect steady state operation of the columns.

BACKGROUND OF THE INVENTION

It is known in the art that the efficiency of a vapour/liquid contact column is dependent on a number of factors including distribution of the liquid within the column. Optimum column performance may be achieved if liquid distribution in the column is uniform over the area of horizontal cross-section throughout the length of the column. This condition may be referred to as "steady state". Even small maldistributions of liquid can have a significant and adverse effect on column efficiency.

Figure 1:
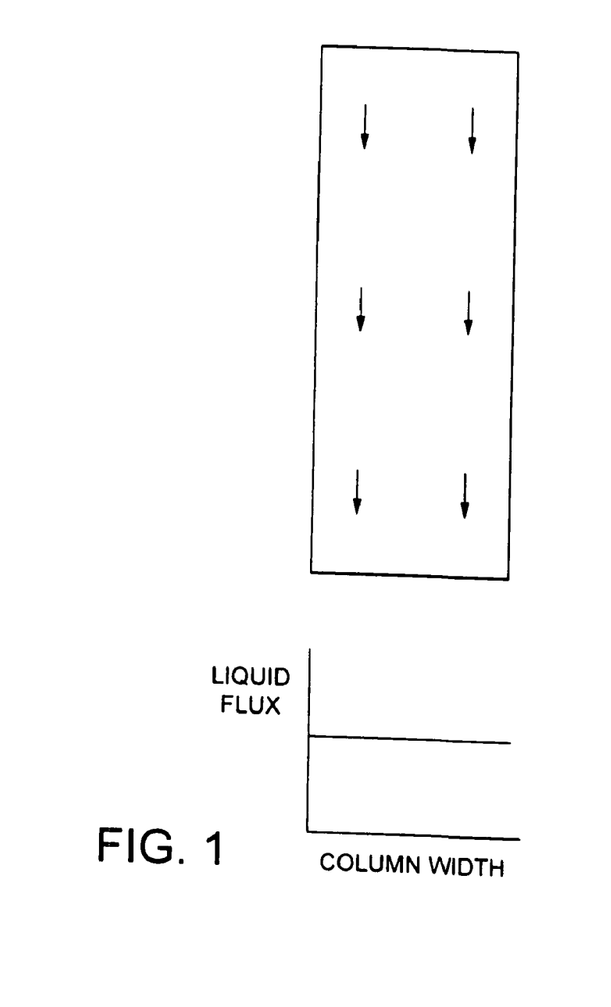
FIG. 1 is a diagrammatic representation of a vapour/liquid contact column in "steady state"

Steady state operation of a vapour/liquid contact column is possible when the column is stationary and aligned vertically (see FIG. 1). If the column is moved, for example, tilted out of vertical alignment, liquid distribution within the column is adversely affected (see FIG. 2). Tilting a vapour/liquid contact column from the vertical by as little as 1° can significantly reduce column efficiency.

In the case of land-based columns, such movement may be observed when columns (particularly tall, thin columns) sway due to high winds. However, movement is more apparent in the case of columns used offshore on floating platforms which are subject to "sea motion" where the rolling and pitching motion of the platform continually tilts the column out of vertical alignment (see FIG. 3). Under such conditions, the average inclination of the column is usually between 1° and 3° from the vertical but the column may often be inclined by as much as 10°. Large ships typically roll ±2° from the vertical and the time taken for one roll cycle is about 15 s. De Bussy (AIChE; March 2000) discusses of the type of problems encountered when using vapour/liquid contact columns offshore.

Oil and natural gas are both valuable natural sources of hydrocarbons. However, after extraction from the Earth, both oil and natural gas need to be processed into more useful products in order to maximise their usefulness. For example, oil may be refined into a variety of hydrocarbon products and natural gas may be converted into methanol or into Fischer-Tropsch hydrocarbon liquids, such as LPG, diesel and gasoline. The required processing facilities are ideally located at or near the sites of extraction as then it is not necessary to incur the substantial cost of transporting the oil and natural gas from the extraction facility to the processing facility. Such location does not usually present any problems in cases where the reserves of the natural products are on land. However, this is not the case where the oil and natural gas reserves are found offshore.

Oil and natural gas are usually transported between offshore extraction facilities and land-based processing facilities either by tanker or by pipelines laid on the sea bed. The associated capital and operating costs of such transportation methods are very high. For this reason, there is much interest in developing floating processing facilities for use offshore. Not only do such facilities have the benefit of significantly reducing the overall costs of producing useful products from these resources, but also the floating facilities themselves may be readily redeployed to other sites.

Vapour/liquid contact columns are usually packed with structured packing to increase the degree of contact between the ascending vapour and the descending liquid. EP-A-1036590 (Sunder et al; 2000) discloses corrugated structured packing suitable for a cryogenic air separation column.

U.S. Pat. No. 5,984,282 (Armstrong et al; 1999) discloses a vapour/liquid contact column for use offshore. The characterising feature of this column is the specific arrangements of sections of structured packing which reduce the adverse effects of sea motion on column efficiency.

U.S. Pat. No. 6,397,630 (Fraysse et al; 2002) discloses an offshore floating structure comprising a cryogenic air distillation column. The characterising feature of the floating structure is that the column is packed with cross-corrugated structured packing having a specific structure designed to negate the effects of sea motion on column efficiency.

Vapour/liquid contact columns are used for a variety of purposes in oil and natural gas processing. For example, oil may be fractionated in thermal distillation columns. In addition, sea water may be deoxygenated using vapour/liquid contact columns prior to injection into an oil reserve for pressure maintenance. Further, air may be separated in a cryogenic distillation column system to produce oxygen which may then be used for a number of purposes including converting natural gas into synthesis gas. The synthesis gas may be converted using the Fischer-Tropsch process to liquid hydrocarbons, such as LPG, diesel and gasoline, or the synthesis gas may be converted to methanol. Vapour/liquid contact columns are also used for separation of Fischer-Tropsch reaction products, for liquefied petroleum gas ("LPG") recovery, for feed gas treatment on natural gas liquefaction plants and for gas drying operations. The present invention has application in each of these examples of vapour/liquid contact columns.

The results of a number of investigations into the effects of tilt and motion on vapour/liquid contact column performance have been published. For example, Tanner et al (Trans. I. Chem. E.; 1996; E.74.A; 177-182) studied the effects of tilt and motion on liquid distribution in a column packed with polypropylene Pall rings. In addition, Hoerner et al (CEP; November 1982; 47-52) studied the effects of tilt and motion on the separation of a mixture of methylcyclohexane and toluene using a 5 m column packed with regular packing.

Tilt and motion effects on a water deaeration column were studied by Tanner et al (Proc. Distillation and Absorption; 1992; I. Chem. E. Symp. Series No. 128; B.111-B.118). In this study, the column was packed up to a packed height of 2.45 m with six sections of structured packing having a surface area of 250 $m^2/m^3$.

Tilt and motion effects on liquid distribution with a vapour/liquid contact column have been studied by Waldie et al (AIChE Distillation Meeting; April 2004). In this study, the column was packed to a packed height of up to 4 m with 20 layers of structured packing having a surface area of 500 $m^2/m^3$.

After carrying out further studies into tilt and motion effects on liquid distribution within vapour/liquid contact columns, the Inventors of the present invention have discovered that the height of a packing section and the specific surface area of the structured packing are important factors for reducing liquid maldistribution in a column in motion. The above-mentioned publications do not disclose the importance of either of these factors to liquid distribution within such a column in motion.

It is an objective of preferred embodiments of the present invention to reduce the level of liquid maldistribution usually observed when a vapour/liquid contact column is subjected to motion and thereby to improve the efficiency of the column.

SUMMARY OF THE INVENTION

According to a first aspect of the present invention, there is provided use of at least one section of structured packing in a vapour/liquid contact column operating in locations where environmental conditions adversely affect steady state operation of the column to reduce maldistribution of liquid in the column under motion. The or each section of the packing is characterised in that:

(a) the length of the section is from about 1 m to about 6 m; and (b) the specific surface area of the structured packing of the section is greater than 500 m$^2$/m$^3$.

According to a second aspect of the present invention, there is provided a buoyant platform for supporting an offshore oil or natural gas processing facility. The platform comprises at least one vapour/liquid contact column comprising at least one section of structured packing. The or at least one of the sections is characterised as in the first aspect.

DETAILED DESCRIPTION OF THE INVENTION

According to a first aspect of the present invention, there is provided use of at least one section of structured packing, the or each section of the packing being characterised in that:

(a) the length of the section is from about 1 m to about 6 m; and (b) the specific surface area of the structured packing of the section is greater than 500 m$^2$/m$^3$, in a vapour/liquid contact column operating in locations where environmental conditions adversely affect steady state operation of the column to reduce maldistribution of liquid in the column under motion.

A "section" in this context may comprise one layer of structured packing. However, a section usually comprises a plurality of such layers, for example from about 5 to about 30 layers, e.g. about 20 layers. The number of layers usually depends, at least in part, on the nature and thermodynamics of the process to be carried out within the column.

"Structured packing" takes its usual meaning in the art and refers generally to sheets of cross-corrugated material, usually metal, which are usually perforated and which, in use in a vapour/liquid contact column, increase the degree of contact between the vapour and the liquid.

The "length" of a section is the dimension of the section along the longitudinal axis, i.e. in the direction of fluid flow when the section is in use in a column. The length in the present context is usually determined by the need for redistribution of the liquid within the column.

The "environmental conditions" include wind when the column is land-based or offshore and sea motion when the column is offshore.

The Inventors have discovered that liquid maldistribution in a vapour/liquid contact column in motion is reduced if the column is packed with at least one section of structured packing having a specific surface area of more than about 500 m$^2$/m$^3$ and if the length of the packed section is from about 1 m to about 6 m. They have also discovered that the level of liquid maldistribution is inversely proportional to the specific surface area of the packing. Thus, the higher the surface area of the packing, the greater the reduction in the level of liquid maldistribution.

Without wishing to be bound by any particular theory, the Inventors believe that the reduction in the level of liquid maldistribution is due at least in part from an associated decrease in the thickness of the film of liquid provided on the surface of the packing. As the film of liquid is thinner than in existing offshore columns, it is less susceptible to inertia as the column moves back and forth, in and out of vertical alignment. In this way, distribution of the liquid within the column is less affected by movement and column efficiency is at least maintained or even improved.

The vapour/liquid contact column may be located on land or offshore. In embodiments where the column is located on land, the column may be subjected to movement out of vertical alignment by wind and even by tremors through the Earth. In embodiments where the column is located offshore, the column may be moved out of vertical alignment by wind and by sea motion.

The present invention is particularly useful in offshore applications. In such applications, the column is usually mounted on a buoyant platform.

The Inventors have discovered that the length of a section of structured packing should be kept to within a particular range, irrespective of the column diameter, before the liquid should be redistributed. This range is from about 1 m to about 6 m but is preferably from about 2 m to about 4 m.

The cost of structured packing is proportional to the specific surface area. Therefore, the specific surface area of the structured packing is usually no more than about 1500 m$^2$/m$^3$. Preferably, the specific surface area is from about 600 m$^2$/m$^3$ to about 1200 m$^2$/m$^3$, e.g. from about 700 m$^2$/m$^3$ to about 800 m$^2$/m$^3$. The specific surface area of the structured packing is typically about 750 m$^2$/m$^3$.

The column may comprise a single section of structured packing, that section being as defined in the first aspect of the present invention. However, the column usually comprises a plurality of sections. In some embodiments, it may be preferable that only a portion of said plurality sections be as defined in the first aspect although, in most preferred embodiments, all of said plurality of sections are as so defined.

The column may further comprise a liquid redistributor provided between at least one adjacent pair of sections of structured packing.

The column may be a thermal distillation column, a water deoxygenation column, a cryogenic air separation column, a Fisher-Tropsch reaction product separation column, an LPG recovery column, a feed gas treatment column in natural gas liquefaction plants or a gas drying column. In preferred embodiments, the column is a mass transfer separation column. Preferably, the column is a cryogenic air separation column.

According to a second aspect of the present invention, there is provided a buoyant platform for supporting an offshore oil or natural gas processing facility, wherein said platform comprises at least one vapour/liquid contact column comprising at least one section of structured packing, the or at least one of said sections being characterised in that:

(a) the length of said section is from about 1 m to about 6 m; and (b) the specific surface area of the structured packing of said section is greater than 500 m$^2$/m$^3$.

The platform may be any buoyant platform suitable for supporting an oil or natural gas processing facility and is usually selected from the group consisting of a rig, ship, boat, pontoon and barge.

The section of structured packing and the vapour/liquid contact column of the buoyant platform may have any of the features described above in any technically feasible combination.

FIG. 1 depicts a vapour/liquid contact column in steady state. The column is in vertical alignment and thus the flow of liquid through the column is uniform across the horizontal plane of the column. Liquid flux will be substantially the same at any point across the width of the column.

Figure 2:
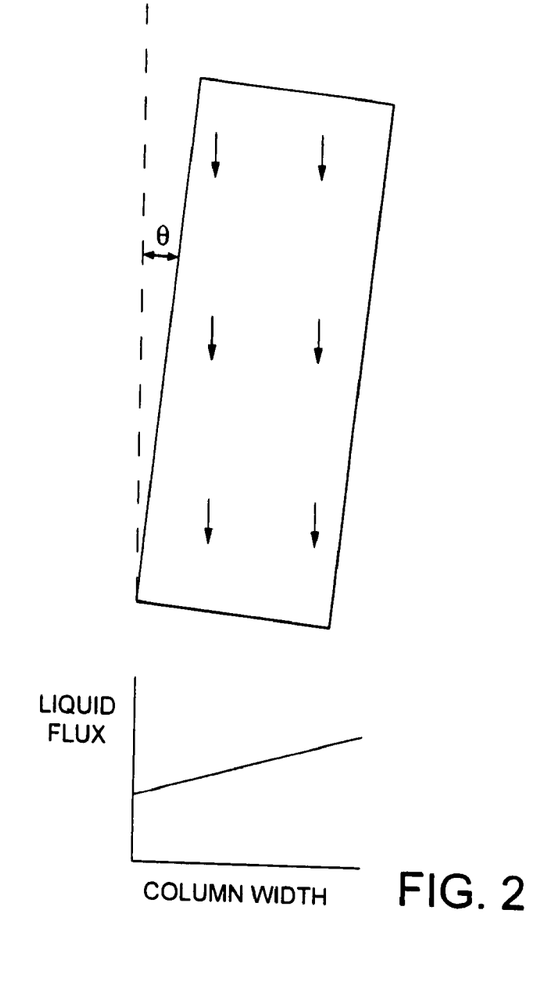
FIG. 2 is a diagrammatic representation of the column of FIG. 1 tilted out of vertical alignment.

FIG. 2 depicts a vapour/liquid contact column tilted by θ° to the vertical. Flow of liquid through the column is not uniform across the horizontal plane of the column. Liquid flux will be greater towards the side of the column in the direction of tilt.

Figure 3:
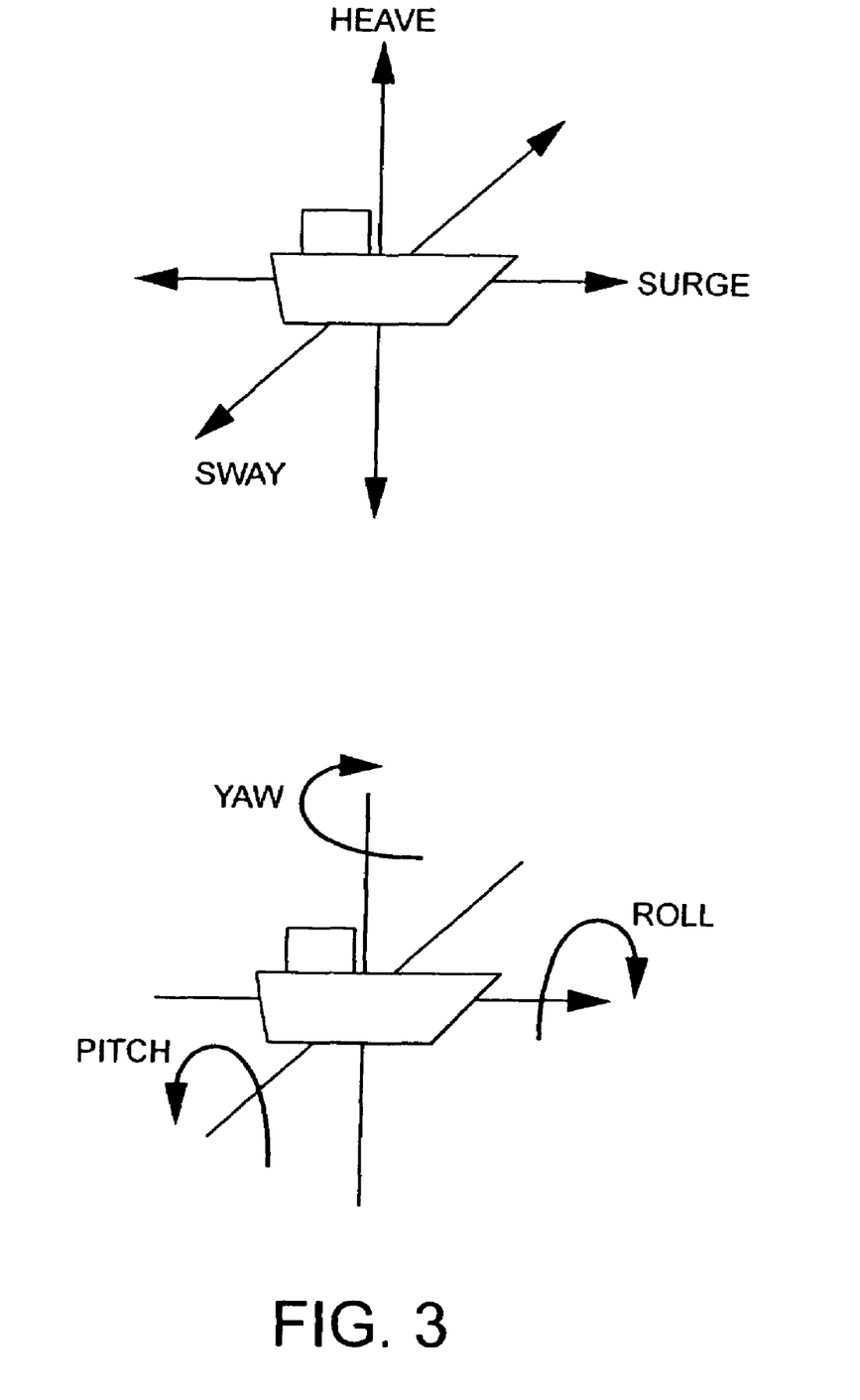
FIG. 3 is a diagrammatic representation of "sea motion"

FIG. 3 depicts "sea motion" to which a floating platform such as a boat is subjected. A vapour/liquid contact column mounted on such a platform will also be subjected to the same motion and therefore will not be in steady state.

EXAMPLES

Figure 4:
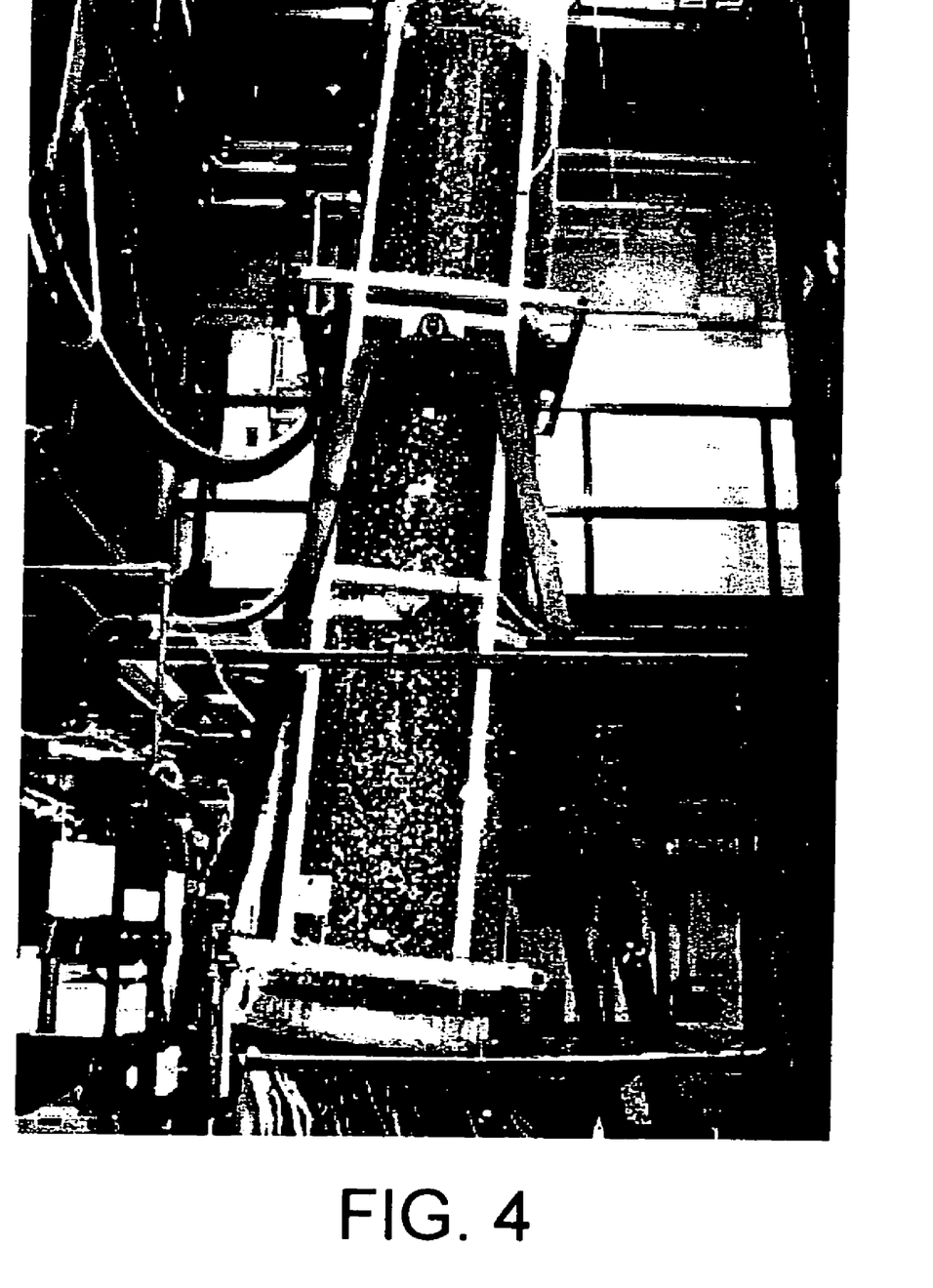
FIG. 4 is a photograph of a column according to the present invention on a test rig to simulate sea motion for the Examples.

The experiments in the following Examples were carried out using the column depicted in FIG. 4. The column is 5 m tall, has a diameter of 1 m and is made from colourless, transparent acrylic material (so that liquid flow through the column may be observed and filmed from outside the column). The column is packed with metal structured packing.

The column is mounted on pivots at near mid height and a mechanical drive is used to move the column about the pivots. A pressurised distributor was used so that initial liquid distribution in the column was unaffected by tilt or motion of the column.

The liquid used in the experiments was a composition of mains water with a surfactant solution and defoamer as indicated in Table 1. The surface tension of the composition was significantly less than that for water although more than that for liquid oxygen or liquid nitrogen (see Table 1).

TABLE 1

| System | Pressure MPa (bara) | Liquid density kg/m$^3$ | Liquid viscosity* m$^2$/s | Surface Tension kg/s$^2$ |
|---|---|---|---|---|
| air/water/Surfactant | 0.10 (1.0) | 1000 | 1.03 | 34 |
| Ar/O$_2$ | 0.14 (1.4) | 1250 | 0.17 | 11.9 |
| N$_2$/O$_2$ | 0.52 (5.2) | 750 | 0.12 | 5.5 |

*kinematic viscosity

Figure 5:
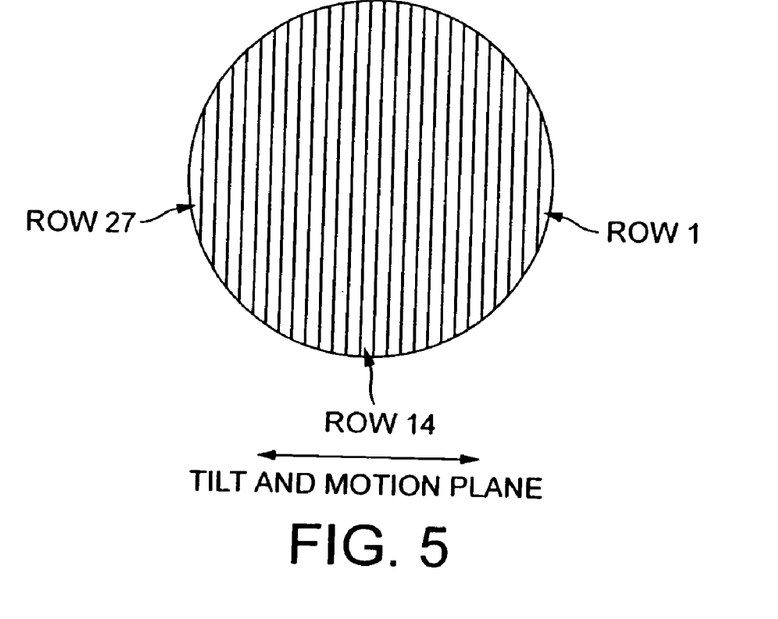
FIG. 5 is a diagrammatic representation of a cross section through the column depicted in FIG. 4 illustrating 27 rows of cells perpendicular to the plane of tilt.

The influence of static tilt on liquid distribution through the column was studied by collecting liquid in cells provided at the base of the column. These cells were grouped into 27 rows running at 90° to the plane of tilt as depicted in FIG. 5. The results are depicted graphically with mean flux per row plotted against row position across the column.

Figure 6:
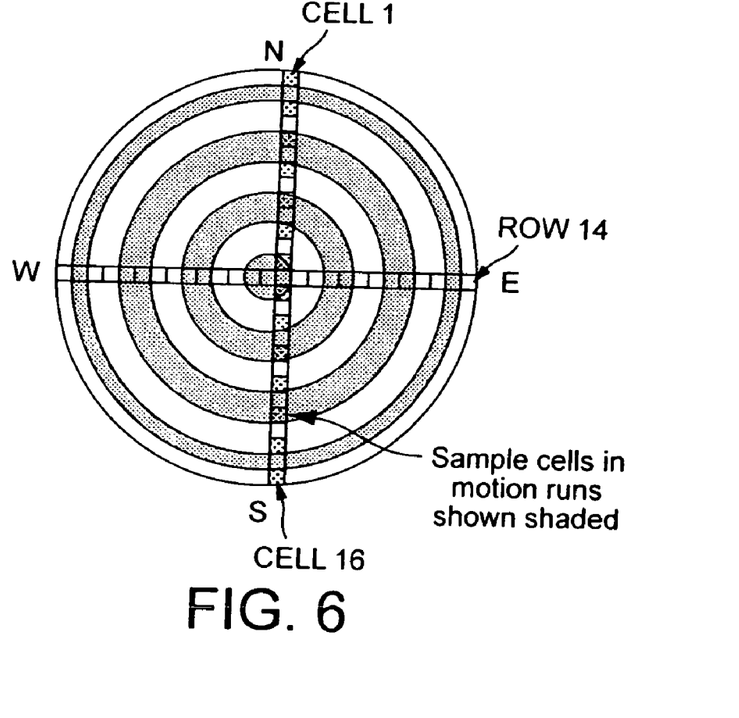
FIG. 6 is a diagrammatic representation of the theoretical annular sections of the cross section depicted in FIG. 5 used to analyse the results from the Examples.

The influence of motion on liquid distribution through the column was studied by continuously measuring fluxes to selected cells. Fluxes were measured either in cells connected to the measuring cells through flexible tubes or in a single cell from which liquid fell freely into a measuring cell which moved with the column. The results of motion tests were analysed in annular sections as shown in FIG. 6 based on the flux measured in cells on the N-S axis.

The results of the following tilt and motion studies can be used to determine the performance of a cryogenic air distillation column system under these conditions. In these studies, the bottom section of packing of the low pressure column was studied. Aspen Plus™ was used to simulate the distillation by creating a model containing parallel columns. Twenty ideal stages were modelled.

Example 1

The Effect of Specific Surface Area of Packing

The effect of increasing the specific surface area of the structured packing used in the column was studied by comparing the performance of packing having a specific surface area of 500 m$^2$/m$^3$ with packing having a specific surface area of 750 m$^2$/m$^3$. The following is a summary of the experimental conditions:

2 m packed height of standard structured packing (specific surface areas of 500 m$^2$/m$^3$ or 750 m$^2$/m$^3$);

liquid flow rate to the packing of 1.6 l/s (94 l/min);

liquid composition (consisting of 750 ppm Surfynol 420 with 50 ppm of Surfynol DF110 foam suppressant) having a surface tension of 34 dyne/cm at 20° C.;

pressurised distributor; and

Test conditions:

(a) static (vertical);

(b) static (1° tilt);

(c) static (4° tilt); and (d) motion (±3° tilt, frequency of 35 s).

The results of Tests (a) to (d) are depicted graphically (mean liquid flux per row or annulus) in FIGS. 7 to 10 respectively.

Figure 7:
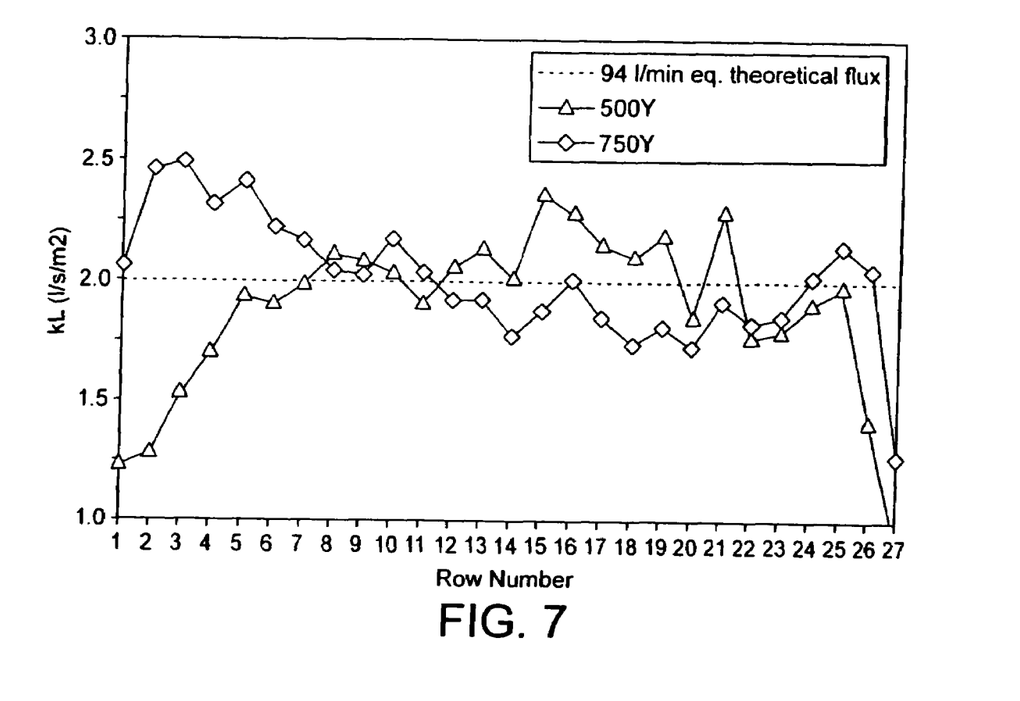
FIG. 7 is a graphical representation of liquid flux in a vertical static column using structured packing having a specific area of either 500 m$^2$/m$^3$ or 750 m$^2$/m$^3$.
Figure 8:
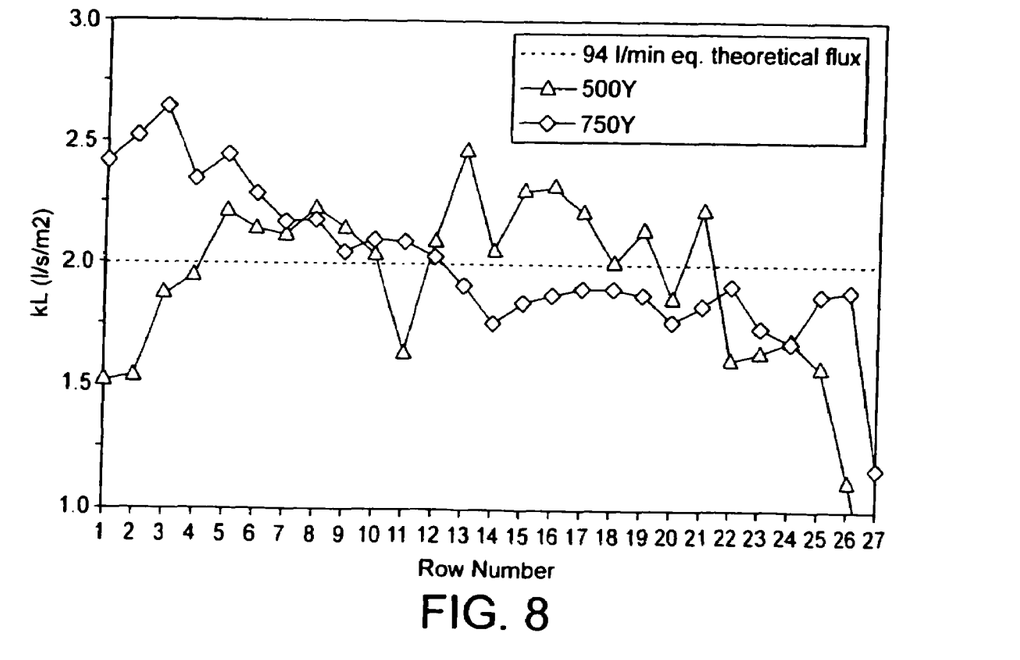
FIG. 8 is a graphical representation of liquid flux in a static column tilted at 1° from the vertical using structured packing having a specific area of either 500 m$^2$/m$^3$ or 750 m$^2$/m$^3$.
Figure 9:
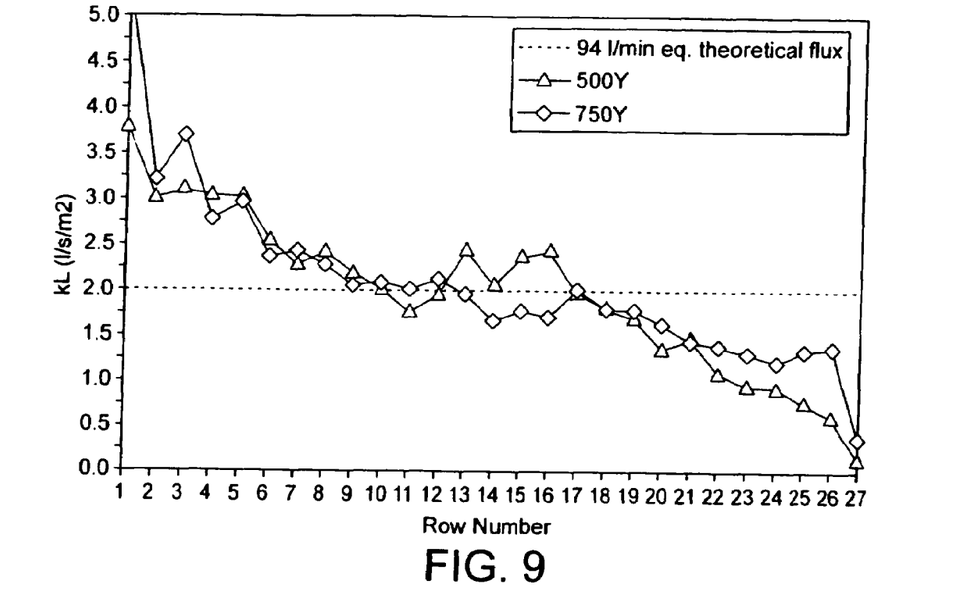
FIG. 9 is a graphical representation of liquid flux in a static column tilted at 4° from the vertical using structured packing having a specific area of either 500 m$^2$/m$^3$ or 750 m$^2$/m$^3$.

FIGS. 7 to 9 illustrate that the degree of liquid maldistribution is proportional to the angle at which the column is tilted. There appears to be less variation in the mean liquid flux when the higher surface area packing is used, particularly when the column is either vertical or inclined at only 1° tilt.

Figure 10:
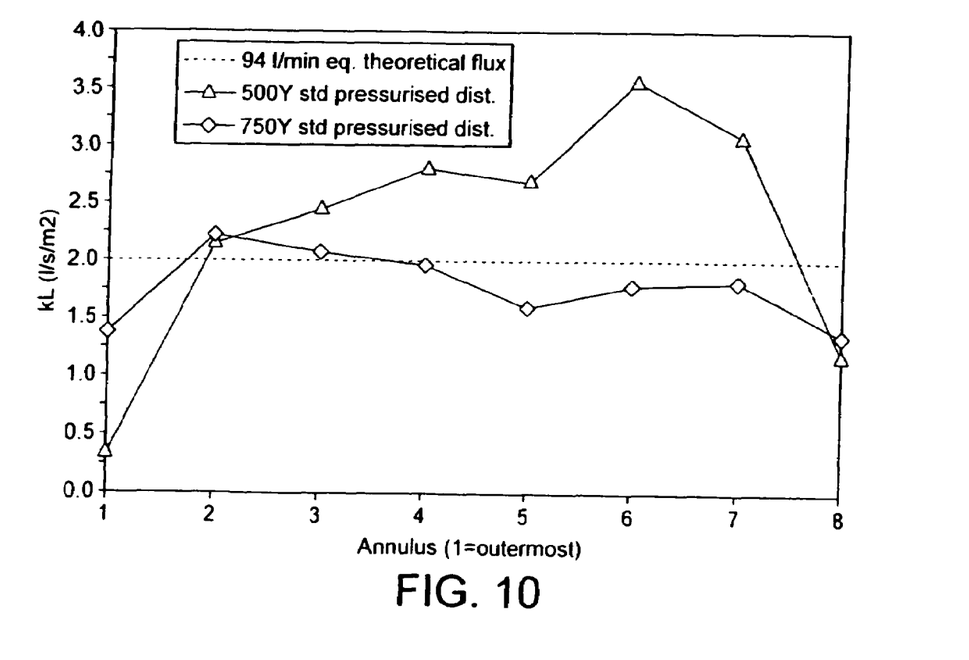
FIG. 10 is a graphical representation of liquid flux in a column tilting between ±3° from the vertical using structured packing having a specific area of either 500 m$^2$/m$^3$ or 750 m$^2$/m$^3$.
Figure 11:
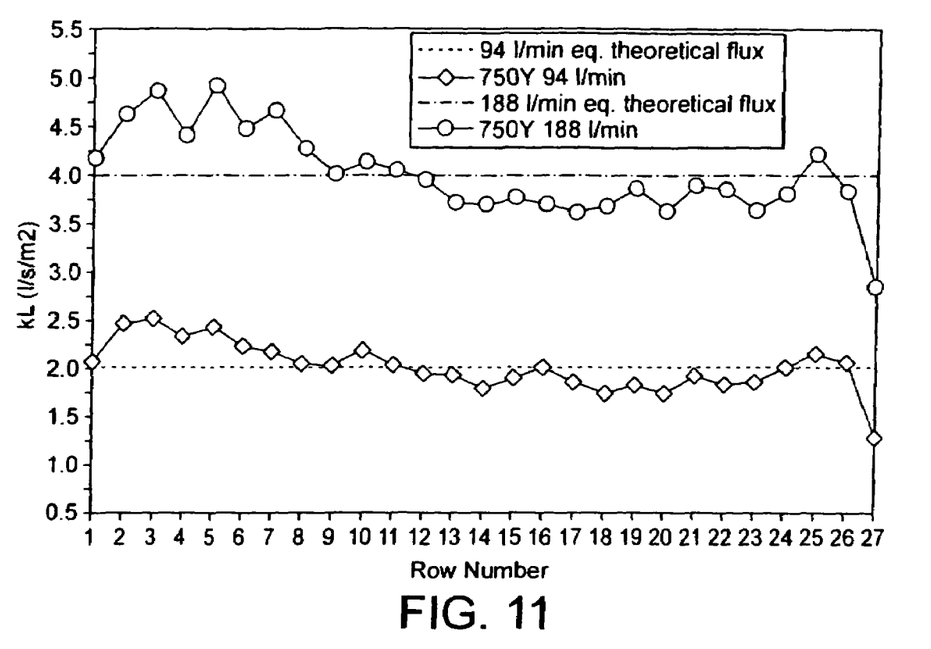
FIG. 11 is a graphical representation of liquid flux at two flow rates in a vertical static column using structured packing having a specific area of 750 m$^2$/m$^3$.
Figure 12:
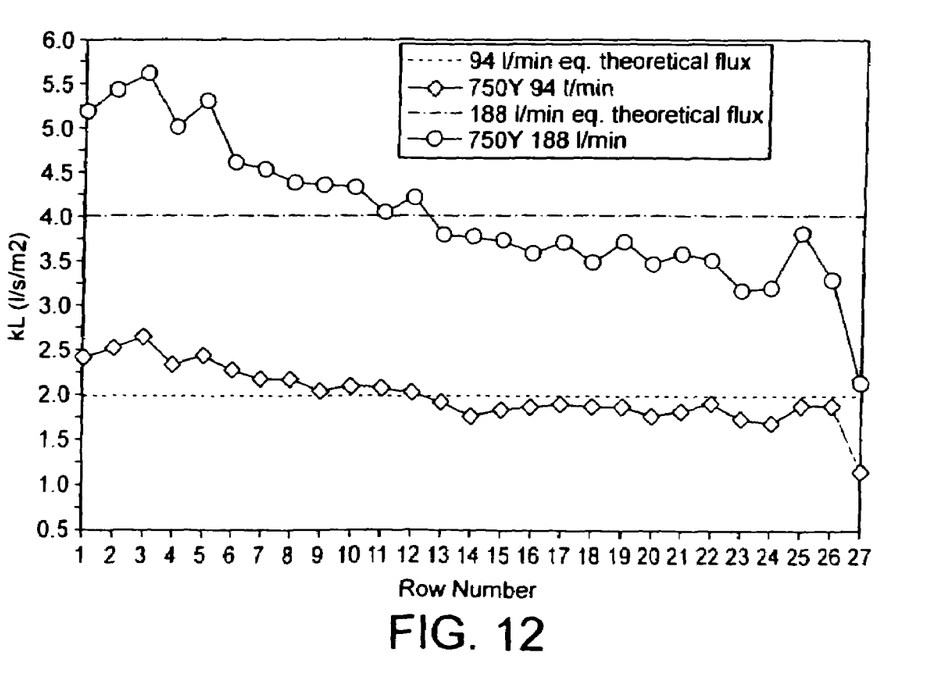
FIG. 12 is a graphical representation of liquid flux at two flow rates in a static column tilted at 1° from the vertical using structured packing having a specific area of 750 m$^2$/m$^3$.
Figure 13:
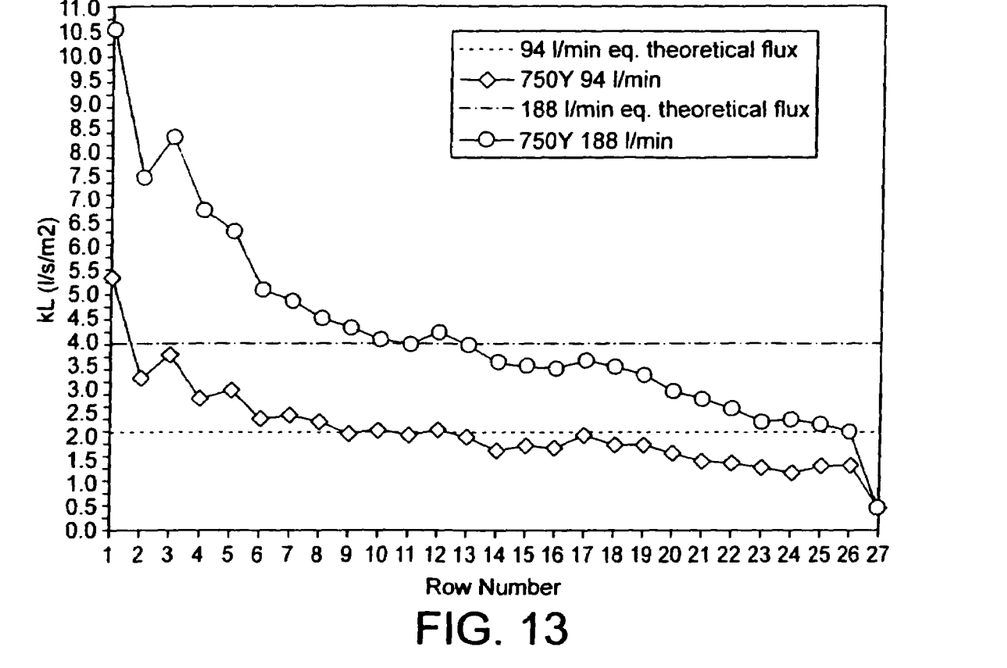
FIG. 13 is a graphical representation of liquid flux at two flow rates in a static column tilted at 4° from the vertical using structured packing having a specific area of 750 m$^2$/m$^3$.
Figure 14:
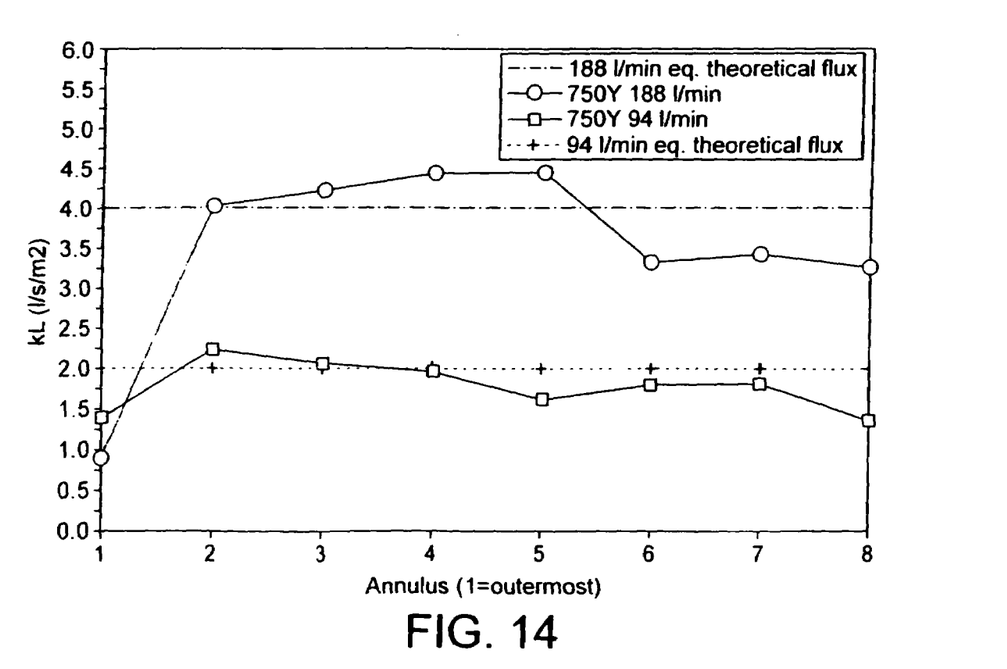
FIG. 14 is a graphical representation of liquid flux at two flow rates in a column tilting ±3° from the vertical using structured packing having a specific area of 750 m$^2$/m$^3$.

FIG. 10 illustrates that the liquid flux in a column in motion (±3° tilt, motion period of 35 s) is significantly closer to the theoretical flux across the cross sectional area of the column when the higher surface area packing is used. This result is a clear indication that increasing the specific surface area of the structured packing reduces the level of liquid maldistribution in a column in motion.

The experimentally derived fluxes for the two types of column packing from Tests (a) to (d) were used as the input to a parallel column modelling analysis, assuming two sections of ten ideal stages with redistribution of vapour and liquid between these two sections. The projected column efficiencies are listed in Table 2 and are those implied within the twenty stages caused by the maldistribution found in the experimental work.

TABLE 2

| Packing | Flow | Vertical | 1° Tilt | 4° Tilt | ±3° Motion |
|---|---|---|---|---|---|
| 500 m²/m³ | 1.6 l/s (94 l/min) | 93.50% | 91.80% | 73.10% | 71.40% |
| 750 m²/m³ | 1.6 l/s (94 l/min) | 96.20% | 94.40% | 75.80% | 93.30% |

The results of the modelling support what is evident from the preceding figures, that is that liquid maldistribution within a moving column may be reduced by increasing the specific surface area of the structured packing.

Example 2

The Effect of Mean Liquid Film Thickness

The effect of liquid flow rate (and, thus, the mean thickness of the liquid film on the surface of the packing) was studied by comparing the performance of packing having a specific area of 750 m²/m³ at two liquid flow rates. The following is a summary of the experimental conditions:

2 m packed height of standard structured packing having a specific area of 750 m²/m³;

liquid flow rate to the packing of 1.6 l/s (94 l/min) or 3.1 l/s (188 l/min);

liquid composition (consisting of 750 ppm Surfynol 420 with 50 ppm of Surfynol DF110 foam suppressant) having a surface tension of 34 dyne/cm at 20° C.;

pressurised distributor; and

Test conditions:
  (e) static (vertical);
  (f) static (1° tilt);
  (g) static (4° tilt); and
  (h) motion (±3° tilt, frequency of 35 s).

The results of Tests (e) to (h) are depicted graphically (mean liquid flux per row or annulus) in FIGS. 11 to 14 respectively. Each of FIGS. 11 to 14 illustrates that the degree of liquid maldistribution is greater for the higher liquid flow rate (and, thus, for the thicker liquid film) than for the lower liquid flow rate. These results support the Inventors hypothesis that a thinner surface film leads to improved liquid resistance to motion and liquid distribution within a tilted column or a column in motion.

The experimentally derived fluxes for the two flow rates from Tests (e) to (h) were used as the input to a parallel column modelling analysis, assuming two sections of ten ideal stages with redistribution of vapour and liquid between these two sections. The projected column efficiencies are listed in Table 3 and are those implied within the twenty stages caused by the maldistribution found in the experimental work.

TABLE 3

| Packing | Flow | Vertical | 1° Tilt | 4° Tilt | ±3° Motion |
|---|---|---|---|---|---|
| 750 m²/m³ | 1.6 l/s (94 l/min) | 96.20% | 94.40% | 75.80% | 93.30% |
| 750 m²/m³ | 3.1 l/s (188 l/min) | 96.60% | 90.40% | 68.90% | 77.70% |

The results of the modelling support what is evident from FIGS. 11 to 14, that is that there is a reduction in performance of packing having a specific area of 750 m²/m³ with a higher liquid flow rate, supporting the claim that a thinner surface film on the packing leads to better performance.

It will be appreciated that the invention is not restricted to the details described above with reference to the preferred embodiments but that numerous modifications and variations can be made without departing from the spirit or scope of the invention as defined by the following claims.

The invention claimed is:

1. A method of operating at least one section of structured packing in a countercurrent vapour/liquid contact column to reduce maldistribution of a liquid in the countercurrent vapour/liquid contact column under sway motion conditions of ±3° tilt from the vertical, the method which comprises the steps of:

providing the countercurrent vapour/liquid contact column under a sway motion of ±3° tilt from the vertical;

providing a liquid to the countercurrent vapour/liquid contact column; and using as the at least one section of structured packing a section having a length of about 1 m to about 6 m and a specific surface area of about 600 m²/m³ to about 1500 m²/m³, wherein the at least one section of structured packing used in the countercurrent vapour/liquid contact column reduces maldistribution of the liquid and increases the efficiency of the countercurrent vapour/liquid contact column compared to a countercurrent vapour/liquid contact column under a sway motion of ±3° tilt from the vertical using structured packing with a specific surface area of less than 500 m²/m³.

2. The method of claim 1, wherein the countercurrent vapour/liquid contact column is located offshore.

3. The method of claim 1, wherein the countercurrent vapour/liquid contact column is mounted on a buoyant platform.

4. The method of claim 1, wherein the length of the at least one section is about 2 m to about 4 m.

5. The method of claim 1, wherein the specific surface area of the structured packing is about 750 m²/m³.

6. The method of claim 1, wherein the countercurrent vapour/liquid contact column comprises a plurality of sections of structured packing wherein at least one of the sections is as defined in claim 1.

7. The method of claim 1, wherein the countercurrent vapour/liquid contact column comprises a plurality of sections of structured packing wherein the plurality of sections are as defined in claim 1.

8. The method of claim 6, further comprising using a liquid distributor between at least one adjacent pair of sections of structured packing.

9. The method of claim 1, wherein the countercurrent vapour/liquid contact column is a mass transfer separation column.

10. The method of claim 1, wherein the countercurrent vapour/liquid contact column is a cryogenic air separation column.

11. A buoyant platform for supporting an offshore oil or natural gas processing facility, wherein the platform comprises at least one countercurrent vapour/liquid contact column subject to a sway motion of ±3° tilt from the vertical, and wherein the at least one countercurrent vapour/liquid contact column comprises at least one section of structured packing, the at least one section being characterised in that:
 (a) the length of the section is from about 1 m to about 6 m; and
 (b) the specific surface area of the structured packing of the section is about 600 $m^2/m^3$ to about 1500 $m^2/m^3$,
 wherein the at least one section of structured packing reduces maldistribution of a liquid and increases the efficiency of the countercurrent vapour/liquid contact column compared to a countercurrent vapour/liquid contact column under a sway motion of ±3° tilt from the vertical utilizing structured packing with a specific surface area of less than 500 $m^2/m^3$.

12. A buoyant platform as claimed in claim 11 selected from the group consisting of a rig, ship, boat, pontoon and barge.

13. The method of claim 1, wherein the sway motion has a frequency between about 15 seconds and 35 seconds.

* * * * *